Patented Nov. 15, 1949

2,487,898

UNITED STATES PATENT OFFICE 2,487,898

TERPENE RESINS

Alfred L. Rummelsburg, Wilmington, Del., assignor to Hercules Powder Company, Wilmington, Del., a corporation of Delaware No Drawing. Application September 4, 1945, Serial No. 614,432

11 Claims. (Cl. 260—82.1)

This invention relates to new resinous compositions of matter and to processes for their production. More particularly, it relates to resins prepared by the copolymerization of a terpene with 1,3-butadiene or a suitable derivative thereof.

Terpenes have been known to polymerize to products which vary in physical characteristics from viscous oils to soft resins at room temperature. Specifically, when dipentene or a terpinene, dissolved in ethylene dichloride, is contacted with catalysts, such as, boron trifluoride, aluminum chloride, etc. for a period of 27 hours and at a temperature of 0° C. to 5° C., a polymerized product results which is a viscous oil. When alpha-pinene, on the other hand, is contacted with the same catalyst under similar conditions, except that a reaction period of 40 hours is employed, a soft resinous product results which has a drop melting point between about 30° C. and about 40° C. Other catalysts and varied conditions for the polymerization may be employed, however, it has been found impossible to produce appreciable yields of resins having drop melting points above 50° C., and it is unusual that a resin having this maximum melting point is obtained. This condition is quite a disadvantage in connection with the use of these terpene polymers in protective coating compositions. The disadvantage rests in the fact that the use of these materials contributes poor drying properties to the coating compositions. While the use of these polymers as substitutes for ester gum gives improved resistance to discoloration under ultra-violet light and improved gasproofness, etc. to protective coating compositions, the drying properties of the coating compositions are so inferior that they constitute a serious impediment to their commercial acceptability.

Furthermore, the alkali resistance of protective coatings containing terpene polymers has been found to be inferior to that of ester gum containing protective coatings. And although the use of these new materials contributes better water resistance to the resulting coatings than does ester gum, the water resistance of protective coatings containing these polymers is inferior to that of coatings containing, for example, rosin-modified maleate resins, rosin-modified glyptal rosins, and urea formaldehyde resins.

Generally, when a terpene or a mixture of terpenes is subjected to conditions which are conducive to polymerization, the polymers formed are of very low order or degree. Actually, the polymers formed are usually the dimer, the trimer, and the tetramer along with small amounts of higher polymers. The dimer will usually be found to predominate over the other polymers formed. The significant fact is that the average degree or order of polymerization will be rather low. For example, the average degree of polymerization as determined on a weight basis may vary between 2.0 and about 4.0. These values, it will be understood are based on polymerizates which have been treated to remove substantially all of the unpolymerized constituents. In other words, the polymerizates will consist substantially entirely of the dimer, trimer, etc. of the constituent or constituents being polymerized with substantially none of the monomer being present.

It is an object of this invention to provide new resinous products which possess generally higher viscosities or melting points, as the case may be, than the polymers of terpenes or terpene mixtures of the prior art. It is a further particular object of the invention to provide new resinous products which are solid at room temperature.

It is a further object to provide terpene-containing resinous polymers which are characterized by their having a relatively high degree of polymerization when compared with the terpene-containing polymers of the prior art.

A further object of the invention is to provide resinous products which are characterized by their possessing good water and alkali resistance. Also, it is an object to prepare resinous products which when incorporated into protective coatings will yield protective films having good water and alkali resistance.

An additional object is to provide resinous products which when incorporated into protective coatings will yield protective films having good drying characteristics. It is particularly desired to exceed the characteristics of protective coatings containing the terpene polymers of the prior art.

Other objects will appear hereinafter.

In accordance with this invention, it has been found that various terpenes or mixtures thereof may be copolymerized with various compounds having the following general formula:

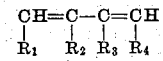

wherein $R_1$ is hydrogen, halogen or an alkyl radial of not more than 2 carbon atoms; $R_2$ is hydrogen, halogen, phenyl or an alkyl radical of not more than 7 carbon atoms; $R_3$ is hydrogen, halogen or an alkyl radical of not more than 7 carbon atoms; where R₄ is hydrogen or an alkyl radical of not more than 2 carbon atoms. The polymerization reaction will be carried out in the presence of a suitable catalyst and under suitable operating conditions to yield resinous materials which have many distinguishing characteristics over the resinous polymers of terpenes or mixtures thereof. These new copolymers are unusual in that they possess generally higher viscosities or melting points, as the case may be, than the resinous polymers produced by the polymerization of terpenes or terpene mixtures. Thus, it is possible in accordance with this invention to prepare products which are viscous liquids or solids which have melting points as determined by the drop method of from about 20° C. up to about 160° C., preferably, between about 50° C. and about 160° C. The average degree of polymerization of these new copolymers will be found to be substantially higher than that of products resulting when terpenes or terpene mixtures are polymerized under similar conditions.

In accordance with the processes of this invention one of the constituents of the mixture which is submitted to the conditions of polymerization is a conjugated butadiene such as 1,3-butadiene or a suitable derivative thereof. Thus, for example, there may be employed 1,3-butadiene; alkyl substituted 1,3-butadienes, such as, (2-methyl - 1,3-butadiene), (2,3-dimethyl - 1,3-butadiene), (2-ethyl - 1,3-butadiene), (2,3-diethyl - 1,3-butadiene), (2-methyl - 3-ethyl - 1,3-butadiene), (2-propyl - 1,3-butadiene), (2,3-dipropyl - 1,3-butadiene), (2-methyl - 3-propyl - 1,3-butadiene), (2-ethyl - 3-propyl - 1,3-butadiene), (2-heptyl - 1,3-butadiene), etc.; halogen substituted 1,3-butadienes, such as, (2-chloro - 1,3-butadiene), (2-bromo - 1,3-butadiene), (2-iodo - 1,3-butadiene), (2,3-dichloro - 1,3-butadiene), (2-3-dibromo - 1,3-butadiene), (2,3-diiodo - 1,3-butadiene), (2-chloro - 3-bromo - 1,3-butadiene), (1,2,3-trichloro - 1,3-butadiene), etc.; phenyl substituted 1,3-butadienes, such as, 2-phenyl-1,3-butadiene, etc.; alkyl and halogen substituted 1,3-butadienes, such as, (2-chloro - 3-methyl - 1,3-butadiene), (1-methyl - 2-chloro - 1,3-butadiene), (2-bromo - 3-methyl - 1,3-butadiene), (2-iodo - 3-methyl - 1,3-butadiene), (2-chloro - 3,4-dimethyl - 1,3-butadiene), etc. Other more highly unsaturated compounds, such as, (3,4-dichloro - 1,2,4,6-hexatetraene), (4-chloro - 1,2,3,5-hexatetraene), and (1,4-dichloro - 2,3,5-hexatriene) may be employed. If desired, a mixture of several of the above compounds may be employed instead of a single one of said compounds in the copolymerization with a desired terpene.

Now, in accordance with the present inventive processes, the terpene constituent may be selected from a large group of operable materials. Any terpene hydrocarbons having the empirical formula C₁₀H₁₆, or a mixture thereof, may be copolymerized with 1,3-butadiene or a suitable derivative thereof as hereinbefore described to produce new resinous products in accordance with the invention. Thus, for example, I may employ acyclic terpenes, such as, myrcene, ocimene, allo-ocimene, cryptotaenene, etc.; monocyclic terpenes, such as, dipentene, alpha-terpinene, beta-terpinene, gamma-terpinene, terpinolene, sylvestrene, alpha-phellandrene, beta-phellandrene, origanene, the pyronenes, etc.; bicyclic terpenes, such as, alpha-thujene, beta-thujene, sabinene, the carenes, alpha-pinene, beta-pinene, camphene, bornylene, alpha-fenchene, beta-fenchene, gamma-fenchene, etc.

In place of pure terpenes or their synthetic mixtures, it is possible to employ naturally-occurring terpene mixtures. Thus, for example, it is possible to employ either wood or gum turpentine. Wood turpentine consists primarily of alpha-pinene, whereas gum turpentine, depending upon its source, will contain varying proportions of alpha- and beta-pinene. Both wood and gum turpentine make excellent raw materials to employ in accordance with the invention. Other fractions containing crude mixtures of various terpenes and obtained as a result of the recovery of oleoresinous material from pine wood may be employed. One such commercially available terpene-containing mixture is known as "Solvenol." This particular mixture contains the monocyclic terpene hydrocarbons, terpinene, terpinolene, and dipentene. Other terpene mixtures which may be employed are those obtained in the heat isomerization of alpha- and/or beta-pinene. When, for example, alpha-pinene is heated at elevated temperatures, it is possible to obtain products containing as much as 40% allo-ocimene along with substantial amounts of alpha-pinene, dipentene and other complex terpene products. Suitable pyrolysis of beta-pinene yields myrcene together with various monocyclic terpenes. Still further, it is possible to employ terpene mixtures obtained in the synthesis of ethers and alcohols from alpha- and beta-pinene. Any of these by-product mixtures containing substantial quantities, even though they may not consist entirely, of terpenes may be suitably employed as the terpene raw materials of the present invention.

In accordance with the present invention, a mixture of a terpene and butadiene or a substitution product thereof, desirably in the presence of an inert solvent, is contacted with a polymerization or condensation catalyst at a temperature which promotes the copolymerization of the constituents for a period sufficiently long to secure a substantial yield of copolymerized product. Desirably, the reaction mixture will be vigorously agitated throughout the period of contact of the reactants with the catalyst.

The polymerization catalysts which will be employed in accordance with this invention comprise the metal halides of the well-known Friedel-Crafts type, such as, boron trifluoride and its molecular complexes with ethers and acids, titanium chloride, ferric chloride, and the halides of metals whose hydroxides are amphoteric, as aluminum chloride, stannic chloride, zinc chloride, etc.

It will be realized that the operable ranges for the catalyst to reactant ratio, reaction temperature, and reaction period, beyond which no reaction takes place are very wide and cannot be precisely ascertained. However, as a practical matter, the operable limits have been ascertained beyond which it would not be economically desirable to operate. Hence, generally, in accordance with the invention, the catalyst to reactant ratio may vary between about 0.001 and about 1.0. The operable temperature may vary from about −60° C. to about +200° C., and the operable reaction period will vary from about 1 to about 400 hours. However, it is preferred when a metal halide of the Friedel-Crafts type is employed, to use a catalyst to reactant ratio between about 0.02 and about 0.25, a reaction temperature between about −20° C. and about +80° C., and a reaction period between about 2 hours and about 24 hours.

In accordance with this invention, the metal halide catalyst is employed in conjunction with a halogenated inert solvent for the reactants. It has been found that when a metal halide catalyst of the Friedel-Crafts type is employed for the copolymerization in conjunction with an inert halogenated solvent, employing a catalyst to reactant ratio, a temperature and a reaction period within the broad operable ranges disclosed hereinabove, generally solid polymers will result.

The ratio of terpene to butadiene or substitution product thereof may vary widely depending upon the particular compounds under consideration. Generally, however, it is preferred to employ the terpene in an amount between about 5% and about 95% of the total weight of the reactants, with the butadiene or substitution product being employed in a corresponding amount of between about 95% and about 5% of the total weight of the reactants. It has been found that as the proportion of butadiene or substitution product thereof is increased, the resulting copolymers tend to have higher melting points and also show a decreasing solubility in drying and semidrying oils. Generally, it may be said that where the ratio of terpene to butadiene or substitution product thereof is 2.5 or greater, copolymers result which are soluble in drying and semidrying oils.

The solvents which may be employed in conjunction with the metal halide catalysts of the Friedel-Crafts type in accordance with this invention generally comprise any inert saturated halogenated hydrocarbon such as methyl chloride, methylene chloride, chloroform, carbon tetrachloride, ethyl chloride, ethylene dichloride, trichloroethylene, tetrachloroethane, and pentachloroethane. The most preferred solvents for this reaction are ethyl chloride and ethylene dichloride.

Following the reaction period, employing the conditions as hereinabove described, the reaction mixture is suitably treated to recover the copolymerization product as determined by the particular procedure employed in accomplishing the reaction. Thus, the catalyst may be removed by washing the reaction mixture with water or an aqueous alkali or an aqueous inorganic acid.

The aqueous acid wash often facilitates the removal of metal halide catalysts from the reaction mixture since it greatly assists in decomposing complexes which the catalyst has formed with unsaturated centers of the materials with which it has come in contact. Following the alkali or acid wash, it is desirable to wash with water to remove all traces of alkali or acid. The solvent and any unreacted constituents are removed, desirably by means of vacuo distillation using, if necessary, a final bath temperature of about 170 to 220° C. An alternative method for recovery of the copolymer after the catalyst has been removed is to dilute the reaction mixture with an organic liquid which is miscible with the inert solvent employed in the reaction but in which the copolymer is insoluble. After vigorous agitation, the copolymer is precipitated from the solution, often in the form of a powder or granules. For example, ethyl alcohol or acetone may be so employed with many of the copolymers prepared in accordance with this invention.

The color of the final products may be improved by utilizing terpenes which have been distilled from caustic. Also, the use of an inert atmosphere such as $CO_2$, $N_2$, etc. during the reaction period leads to the production of pale colored products. Further refinement of the products may be accomplished by treatment with adsorbents such as silica gel, fuller's earth, bauxite, activated carbon, activated magnesium and aluminum silicates, etc. This treatment removes traces of combined catalysts and further bleaches the products. It may be applied either before or after removal of the solvent. Other refining agents which may be employed include selective solvents, such as, furfural, furfuryl alcohol, phenol, etc. If desired, the copolymer resins obtained in accordance with the processes described herein may be subjected to vacuum distillation to remove volatile copolymers, leaving copolymer residues having higher melting points than the initial copolymerization product.

There follow several specific examples which illustrate particular embodiments of the principles of this invention which, however, are in no way to be construed as being limiting. All parts and percentages in this specification and claims are by weight unless otherwise indicated.

*Examples 1 to 3*

In these examples which follow the procedure was to dissolve dipentene and crude butadiene in ethylene dichloride. The crude butadiene employed was a mixture containing 50% butadiene and 50% butane. In the table which follows, the figures for butadiene represent the quantity of pure butadiene employed. Anhydrous aluminum chloride was then added to the solution with cooling and agitation over a period of 20 minutes while the temperature was held at −18° to −10° C. The reaction mixture was then agitated at 0° C. for 2 hours. After diluting the reaction mixture with 1.7 times its weight of ethyl alcohol the precipitate was separated, washed with ethyl alcohol, redissolved in benzene, and the solution washed with aqueous 6% HCl. The solution was then washed with water to remove the HCl and the solvent removed by vacuo distillation. Further reaction conditions, yields, and characteristics of the product are described in the following tabulation:

| Example | Dipentene, parts | Butadiene, parts | Aluminum Chloride, parts | Ethylene Dichloride, parts | Time, hours | Temperature | Yield, parts | Color (Rosin Scale) | Drop Melting Point |
|---|---|---|---|---|---|---|---|---|---|
| | | | | | | °C. | | | |
| 1 | 200 | 62 | 15 | 400 | 2 | −18 to 0 | 170 | WW | Rubbery oil. |
| 2 | 200 | 31 | 15 | 400 | 2 | −18 to 0 | 130 | WW | 93° C. |
| 3 | 200 | 15 | 15 | 400 | 2 | −18 to 0 | 62 | WW | 70° C. |

*Examples 4 to 7*

In these examples the particular terpene and the 2-methyl-1,3-butadiene (isoprene) were dissolved in ethylene dichloride. The particular isoprene employed was an impure material consisting of 90% isoprene and 10% amylene. To the resulting solution of the terpene and isoprene in ethylene dichloride was added the aluminum chloride polymerization catalyst in the form of a 3.5% solution af aluminum chloride in ethylene dichloride over a period of 0.5 to 2.0 hours, with agitation and cooling, maintaining the temperature below 25° C. The reaction mixture was then allowed to stand for a period of about 28 hours at a temperature of from 0° C. to 25° C. The reaction mixture was then washed with 7 times its weight of aqueous 12% HCl and later washed with water to remove HCl. The solvent was evaporated in vacuo. Further reaction conditions, yields, and characteristics of the products are described in the following tabulation:

| Example | Terpene, parts | Crude Isoprene, parts | Aluminum Chloride, parts | Time, hours | Temperature | Yield, parts | Color | Drop Melting Point |
|---|---|---|---|---|---|---|---|---|
| | | | | | °C. | | | °C. |
| 4 | alpha-pinene-50 | 9 | 3.5 | 28 | 0 to 25 | 17 | Brown | 50 |
| 5 | alpha-pinene-30 | 27 | 3.5 | 28 | 0 to 25 | 58 | ...do | 62.5 |
| 6 | dipentene-50 | 9 | 3.5 | 28 | 0 to 25 | 38 | ...do | 55 |
| 7 | dipentene-30 | 27 | 3.5 | 28 | 0 to 25 | 46 | ...do | 73.5 |

*Example 8*

Fifty parts of allo-ocimene (99% pure) and 20 parts of 2-chloro-1,3-butadiene were dissolved in 250 parts of ethyl chloride. Five parts of anhydrous aluminum chloride were added with agitation and cooling at −60° C. to −30° C. over a period of 0.75 hour. Agitation was continued at −60° C. to −40° C. for 2 hours. The reaction mixture was then added slowly to 700 parts of ethyl alcohol with vigorous agitation. A precipitate formed which was separated, thoroughly washed with ethyl alcohol and dried. The resulting copolymer resin was obtained in the amount of 62 parts, having a drop melting point of 110° C., and having a color of 3 Amber on the Lovibond color scale.

*Example 9*

Fifty parts of beta-pinene (99% pure) and 20 parts of 2-chloro-1,3-butadiene were dissolved in 250 parts of ethyl chloride. Five parts of gaseous boron trifluoride were introduced with agitation and cooling at −60° C. to −30° C. over a period of 0.75 hour. Agitation was continued at −60° C. to −40° C. for 2 hours. The reaction mixture was slowly added to 700 parts of ethyl alcohol with vigorous agitation. A precipitate formed which was thoroughly washed with ethyl alcohol and dried. The resulting copolymer resin was obtained in the amount of 65 parts, having a drop melting point of 100° C. to 120° C., and having a color of 5 on the Lovibond color scale.

*Example 10*

Eighty-five parts of dipentene were dissolved in 600 parts of ethylene dichloride contained in a flask equipped with a stirring device, thermometer and drying tube. Fifteen parts of pure 1,3-butadiene were then added, the temperature of the mass being maintained at −10° to −15° C. At the same temperature and during about 20 minutes 5 parts of anhydrous aluminum chloride were added. The reaction mixture was agitated and held at a temperature of −10° to −15° C. for 5½ hours after which it was hydrolyzed by adding 25 parts of water, 800 parts of benzene being added to facilitate the washing of the product. The benzene solution was washed with 15% aqueous hydrochloric acid and then with water 4 times at 50° to 60° C. to remove the hydrochloric acid. The solvent and any unreacted material were removed by distillation in vacuo. The residue consisted of 100 parts of a light-colored solid resin having a melting point of 142° C.

*Example 11*

Example 10 was repeated except that ethyl chloride was used as the solvent in place of the ethylene dichloride. The reaction was carried out and the product isolated as described in that example. The residue consisted of 100 parts of a light-colored solid resin having a melting point of 175° C.

*Example 12*

Eighty-five parts of alpha-pinene were dissolved in 600 parts of ethylene chloride. While maintaining the temperature at −10° to −15° C., 15 parts of pure 1,3-butadiene were added followed by the addition of 5 parts of anhydrous aluminum chloride. The reaction mixture was agitated for 5¾ hours at −10° to −15° C. after which 50 parts of water were added. The reaction mixture was then washed with aqueous 15% hydrochloric acid and then 5 times with water at 50° to 60° C. The solvent and any unreacted material was removed by distillation in vacuo. The residue consisted of 95 parts of a pale-colored solid resin having a melting point of 57° C.

*Example 13*

Eighty-five parts of 95% dipentene was dissolved in 600 parts of chloroform. Fifteen parts of 98% 1,3-butadiene were added at a temperature of −10° to −15° C. At the same temperature 5 parts of anhydrous aluminum chloride were then added in small portions. After the addition of the catalyst the reaction mixture was agitated at −10° to −15° C. for 5½ hours. The catalyst was hydrolyzed by adding 25 parts of water and then washing the reaction mixture with 15% aqueous hydrochloric acid and then 4 times with water at 50° to 60° C. The solvent and unreacted material were removed by distillation in vacuo. The residue consisted of 51 parts of a light-colored viscous resinous material which was soluble in benzene, gasoline and ether but practically insoluble in alcohol and methyl acetate.

The resinous copolymers prepared in accordance with this invention are characterized by their having heavier viscosities or higher melting points, as the case may be, than the polymers prepared from various terpens or terpene mixtures of the prior art. By employing the proper conditions, copolymers can be prepared which range in melting point from room temperature up to about 160° C. These solid resins have an extended scope of utility over the terpene polymers which are generally found to be viscous oils and semisolids at room temperature. The new copolymers of this invention show good resistance to water and to alkalies. These characteristics are also found in films formed from protective coatings containing these new resins. In this respect they are markedly superior to protective coatings prepared from terpene polymers as the resin ingredient. Furthermore, protective coating compositions containing the resinous copolymers of this invention have improved drying characteristics, particularly when compared with those of compositions prepared from terpene polymers.

The films formed by the copolymer resins of this invention are characterized by being strong and somewhat flexible, and they adhere well to various surfaces, such as, wood, glass, paper, or metal. Hence, the resins are very useful in the form of their clear solutions in the lacquer, varnish and adhesive fields. They may also be used in the formulation of pigmented coating compositions, such as, paints and pigmented lacquers for wood, metal, paper, etc. Unpigmented solutions or emulsions of the copolymer resins are suitable for impregnating or coating paper, textiles, fibers, wood, etc. to contribute strength, toughness, flexibility, etc. thereto.

The solubility characteristics of these new resins are such that they may be dissolved in common solvents, such as, gasoline, benzene, toluene, xylene, chlorinated aliphatic and aromatic hydrocarbons, terpenes, hydrogenated naphthalene, etc. They are only slightly soluble in solvents, such as, ethyl alcohol, acetone, dioxane, etc.

It will be understood that wherever in this specification the degree of polymerization is referred to, there is contemplated the average number on a weight basis of polymerizable units which are attached in some manner to each other as a result of the polymerization process. Thus, for example, if 50% of the total polymerizable material employed is converted as a result of polymerization to units each of which contains two of the polymerizable units existing prior to polymerization, whereas the remainder or 50% of the total polymerizable material is converted to units each of which contains three of the polymerizable units existing prior to polymerization, then the average degree of polymerization will be 2.5.

It will be understood that wherever in this specification reference is made to the melting point of a resinous material, a melting point as determined by the Hercules drop method is contemplated.

This application is a continuation-in-part of my application for United States Letters Patent Serial No. 398,108, filed June 14, 1941, now abandoned.

What I claim and desire to protect by Letters Patent is:

1. The process which comprises copolymerizing a mixture of a cyclic terpene in an amount within the range of about 5% and about 95% of said mixture, and in complementary amount, an unsaturated compound having the general formula $$R_1CH=C-C=CHR_4$$
$$\phantom{R_1CH=}R_2\phantom{-}R_3$$

wherein $R_1$ is a member of the group consisting of hydrogen, halogen and alkyl radicals having not more than two carbon atoms; $R_2$ is a member of the group consisting of hydrogen, halogen, phenyl, and alkyl radicals having not more than seven carbon atoms; $R_3$ is a member of the group consisting of hydrogen, halogen, an dalkyl radicals having not more than seven carbon atoms; and $R_4$ is a member of the group consisting of hydrogen and alkyl radicals having not more than two carbon atoms, in the presence of a metal halide Friedel-Crafts catalyst for a reaction period of about 1 hour to about 400 hours and at a temperature between about −60° C. and about +80° C., said process being carried out in solution in an inert halogenated hydrocarbon containing not more than two carbon atoms and five halogen atoms as a solvent for said mixture.

2. The process which comprises copolymerizing a mixture of a monocyclic terpene in an amount within the range af about 5% and about 95% of said mixture and, in complementary amount, an unsaturated compound having the general formula $$R_1CH=C-C=CHR_4$$
$$\phantom{R_1CH=}R_2\phantom{-}R_3$$

wherein $R_1$ is a member of the group consisting of hydrogen, halogen and alkyl radicals having not more than two carbon atoms; $R_2$ is a member of the group consisting of hydrogen, halogen, phenyl, and alkyl radicals having not more than seven carbon atoms; $R_3$ is a member of the group consisting of hydrogen, halogen, and alkyl radicals having not more than seven carbon atoms; and $R_4$ is a member of the group consisting of hydrogen and alkyl radicals having not more than two carbon atoms, in the presence of a metal halide Friedel-Crafts catalyst for a reaction period of about 1 hour to about 400 hours and at a temperature between about −60° C. and about +80° C., said process being carried out in solution in an inert halogenated hydrocarbon containing not more than two carbon atoms and five halogen atoms as a solvent for said mixture.

3. The process which comprises copolymerizing a mixture of a bicyclic terpene in an amount within the range of about 5% and about 95% of said mixture and, in complementary amount, an unsaturated compound having the general formula $$R_1CH=C-C=CHR_4$$
$$\phantom{R_1CH=}R_2\phantom{-}R_3$$

wherein $R_1$ is a member of the group consisting of hydrogen, halogen and alkyl radicals having not more than two carbon atoms; $R_2$ is a member of the group consisting of hydrogen, halogen, phenyl, and alkyl radicals having not more than seven carbon atoms; $R_3$ is a member of the group consisting of hydrogen, halogen, and alkyl radicals having not more than seven carbon atoms; and $R_4$ is a member of the group consisting of hydrogen and alkyl radicals having not more than two carbon atoms, in the presence of a metal halide Friedel-Crafts catalyst for a reaction period of about 1 hour to about 400 hours and at a temperature between about −60° C. and about +80° C., said process being carried out in solution in an inert halogenated hydrocarbon containing not more than two carbon atoms and five halogen atoms as a solvent for said mixture.

4. The process which comprises copolymerizing a mixture of dipentene in an amount within the range of about 5% and about 95% of said mixture and, in complementary amount, an unsaturated compound having the general formula $$R_1CH=C-C=CHR_4$$
$$\phantom{R_1CH=}R_2\phantom{-}R_3$$

wherein $R_1$ is a member of the group consisting of hydrogen, halogen and alkyl radicals having not more than two carbon atoms; $R_2$ is a member of the group consisting of hydrogen, halogen, phenyl, and alkyl radicals having not more than seven carbon atoms; $R_3$ is a member of the group consisting of hydrogen, halogen, and alkyl radicals having not more than seven carbon atoms; and $R_4$ is a member of the group consisting of hydrogen and alkyl radicals having not more than two carbon atoms, in the presence of a metal halide Friedel-Crafts catalyst for a reaction period of about 1 hour to about 400 hours and at a temperature between about −60° C. and about +80° C., said process being carried out in solution in an inert chlorinated hydrocarbon containing not more than two carbon atoms and five chlorine atoms as a solvent for said mixture.

5. The process which comprises copolymerizing a mixture of a pinene in an amount within the range of about 5% and about 95% of said mixture and, in complementary amount, an unsaturated compound having the general formula

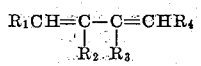

wherein $R_1$ is a member of the group consisting of hydrogen, halogen and alkyl radicals having not more than two carbon atoms; $R_2$ is a member of the group consisting of hydrogen, halogen, phenyl, and alkyl radicals having not more than seven carbon atoms; $R_3$ is a member of the group consisting of hydrogen, halogen, and alkyl radicals having not more than seven carbon atoms; and $R_4$ is a member of the group consisting of hydrogen and alkyl radicals having not more than two carbon atoms, in the presence of a metal halide Friedel-Crafts catalyst for a reaction period of about 1 hour to about 400 hours and at a temperature between about −60° C. and about +80° C., said process being carried out in solution in an inert chlorinated hydrocarbon containing not more than two carbon atoms and five chlorine atoms as a solvent for said mixture.

6. The process which comprises copolymerizing a mixture of dipentene in an amount within the range of about 5% and about 95% of said mixture and, in complementary amount, 1,3-butadiene, in the presence of a metal halide Friedel-Crafts catalyst for a reaction period of about 1 hour to about 400 hours and at a temperature between about −60° C. and about +80° C., said process being carried out in solution in an inert chlorinated hydrocarbon containing not more than two carbon atoms and five chlorine atoms as a solvent for said mixture.

7. The process which comprises copolymerizing a mixture of dipentene in an amount within the range of about 5% and about 95% of said mixture and, in complementary amount, isoprene, in the presence of a metal halide Friedel-Crafts catalyst for a reaction period of about 1 hour to about 400 hours and at a temperature between about −60° C. and about +80° C., said process being carried out in solution in an inert chlorinated hydrocarbon containing not more than two carbon atoms and five chlorine atoms as a solvent for said mixture.

8. The process which comprises copolymerizing a mixture of pinene in an amount within the range of about 5% and about 95% of said mixture and, in complementary amount, 1,3-butadiene, in the presence of a metal halide Friedel-Crafts catalyst for a reaction period of about 1 hour to about 400 hours and at a temperature between about −60° C. and about +80° C., said process being carried out in solution in an inert chlorinated hydrocarbon containing not more than two carbon atoms and five chlorine atoms as a solvent for said mixture.

9. The process which comprises copolymerizing a mixture of dipentene in an amount within the range of about 5% and about 95% of said mixture and, in complementary amount, 1,3-butadiene, in the presence of a metal halide Friedel-Crafts catalyst for a reaction period of about 2 hours to about 24 hours and at a temperature between about −20° C. and about +80° C., said process being carried out in solution in ethylene dichloride as a solvent for said mixture.

10. The process which comprises copolymerizing a mixture of dipentene in an amount within the range of about 5% and about 95% of said mixture and, in complementary amount, isoprene, in the presence of a metal halide Friedel-Crafts catalyst for a reaction period of about 2 hours to about 24 hours and at a temperature between about −20° C. and about +80° C., said process being carried out in solution in ethylene dichloride as a solvent for said mixture.

11. The process which comprises copolymerizing a mixture of alpha-pinene in an amount within the range of about 5% and about 95% of said mixture and, in complementary amount, 1,3-butadiene, in the presence of a metal halide Friedel-Crafts catalyst for a reaction period of about 2 hours to about 24 hours and at a temperature between about −20° C. and about +80° C., said process being carried out in solution in ethylene dichloride as a solvent for said mixture.

ALFRED L. RUMMELSBURG.

REFERENCES CITED

The following references are of record in the file of this patent:

UNITED STATES PATENTS

| Number | Name | Date |
|---|---|---|
| 2,092,295 | Van Peski | Sept. 7, 1937 |
| 2,119,976 | Wilson | June 7, 1938 |
| 2,384,400 | Rummelsburg | Sept. 4, 1945 |